Patented Sept. 4, 1951

2,567,131

UNITED STATES PATENT OFFICE 2,567,131

ORGANOSILICON POLYMERS

John L. Speier, Pittsburgh, Pa., assignor to Dow Corning Corporation, Midland, Mich., a corporation of Michigan No Drawing. Application June 30, 1950, Serial No. 171,552

3 Claims. (Cl. 260—448.2)

This invention relates to organosilicon polymers.

Organosilicon polymers heretofore known are those in which the polymer units are connected by Si—O—Si, Si—C—Si, Si—Si, or Si—N—Si. The instant case relates to polymers in which the polymer chains are composed of interconnected SiCNCSiO atoms.

It is the object of this invention to prepare novel compositions of matter which are useful in the preparation of stable oils and fluids and as oxidation inhibitors for siloxanes.

This invention relates to polymeric compounds of the formula

$(R_2SiCH_2NCH_2SiO)_x$ where $x$ has a value of at least 1, R is selected from the group alkyl and phenyl radicals, and R' is selected from the group alkyl radicals and hydrogen.

These compounds are prepared by reacting bis-chloromethyltetraorganodisiloxanes with ammonia or a primary alkyl amine. The reaction is best carried out by heating a mixture of the siloxane and amine under anhydrous conditions at a temperature between 50° C. and 200° C. Superatmospheric pressures are desirable when volatile amines are employed.

The organic radicals other than the chloromethyl groups do not enter into the reaction. Hence, the R groups are any alkyl radical or phenyl. The reaction proceeds with any alkyl primary amine.

Another method of preparing compounds of this invention is that of reacting a secondary amine of the formula $(R_3SiCH_2)_2NH$ or a tertiary amine of the formula $(R_3SiCH_2)_2NR'$ with sulfuric acid at a temperature from 50° C. to 115° C. When all of the R groups are methyl or two are methyl and one is phenyl, cleavage of one methyl from the former and a phenyl group from the latter takes place to produce siloxane linkages. The reaction may be represented schematically by the equation

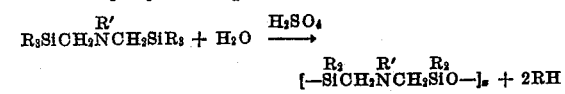

The compounds of this invention may be cyclic in structure or they may be linear. The only two cyclic compounds which have been isolated are those containing one and two units. Mixtures of higher cyclics and the linear compounds have been obtained in the form of viscous oils.

The following examples are illustrative only of the invention which is not limited thereto.

*Example 1.*—401 grams of symmetrical bis-chloromethyltetramethyldisiloxane was heated under pressure with 454 grams of isopropylamine for 2 hours at 130° C. The reaction mixture was diluted with cyclohexane and filtered free of solids. The filtrate was distilled to give the compound

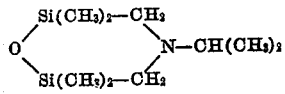

boiling point 117.4° C. at 95 mm. This material had the following physical properties: $n$, 25° C., 1.4328; $d$, 25° C., .785, specific refraction .2965 to .2968.

*Example 2.*—5.5 parts by weight of the secondary amine bis-trimethylsilylmethylamine $[(CH_3)_3SiCH_2]_2NH$ was dissolved in 30 parts by weight concentrated sulfuric acid to which ½ part by weight fuming sulfuric acid had been added. The quantitative amount of methane was evolved based upon the cleavage of one methyl group per silicon atom. The reaction mixture was poured on crushed ice, whereupon the bisulfate salt precipitated. The salt was treated with aqueous NaOH whereupon a mixture of crystals and viscous liquid separated. Upon distillation the crystalline material was found to boil at 152° C. at 23 mm. and melt at 45° C. to 49° C. This was a cyclic material having the formula

The compound was found to have a molecular weight of 359 and a neutral equivalent of 175.7.

The residue was a non-volatile viscous oil which was a polymeric material of the formula $[OSi(CH_3)_2CH_2NHCH_2Si(CH_3)_2]_x$ where $x$ has a value greater than 2.

*Example 3.*—When the secondary amine bis-(phenylmethylethoxysilylmethyl) amine.

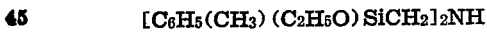

is hydrolyzed, polymeric compounds of the formula

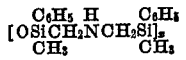

are obtained.

The amine bis(phenylmethylethoxysilylmethyl) amine may be prepared by reacting phenylmethylchloromethylchlorosilane with ethanol and then reacting the ethoxide thus formed with ammonia.

That which is claimed is:

1. A compound of the formula $$(\underset{R_2}{Si}CH_2\underset{R'}{N}CH_2\underset{R_2}{Si}O)_x$$

where $x$ has a value of at least 1, R is selected from the group consisting of alkyl and phenyl radicals, and R' is selected from the group consisting of alkyl radicals and hydrogen.

2.

$$\begin{array}{c} Si(CH_3)_2-CH_2 \\ O \diagdown \qquad \diagup N-CH(CH_3)_2 \\ Si(CH_3)_2-CH_2 \end{array}$$

3. $[OSi(CH_3)_2CH_2NHCH_2Si(CH_3)_2]_2$

JOHN L. SPEIER.

No references cited.